Jan. 18, 1966    J. C. STILES    3,229,531
FORCE BALANCE ACCELEROMETER
Filed Sept. 18, 1962
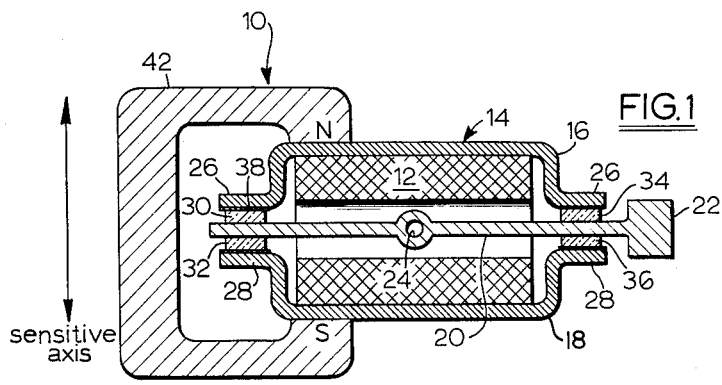
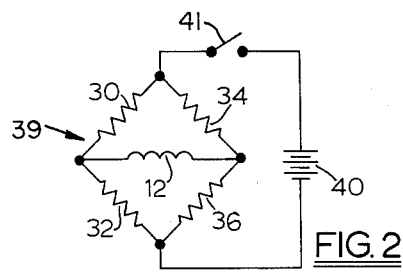
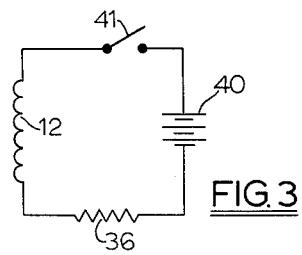
JOHN C. STILES
INVENTOR.
BY S. A. Giarratana
George B. Oujevolk
attorneys

United States Patent Office 3,229,531
Patented Jan. 18, 1966

3,229,531
FORCE BALANCE ACCELEROMETER
John C. Stiles, Morristown, N.J., assignor to General Precision, Inc., Little Falls, N.J., a corporation of Delaware
Filed Sept. 18, 1962, Ser. No. 224,325
2 Claims. (Cl. 73—517)

The present invention relates to force balance accelerometers for navigational and control purposes, and more particularly to a force balance accelerometer having a pickoff of a piezoresistive material.

Prior force balance accelerometers comprised an unbalanced, pivoted proof mass, a pickoff to determine the position of the proof mass, a control amplifier providing a current proportional to the pickoff output and a force applying means driven by the control amplifier for returning the proof mass to the pickoff null position. In accordance with the present invention, the requirement for a control amplifier is eliminated by providing a pickoff having sufficient output to drive the force applying means directly. The pickoff comprises a piezoresistive material which changes its resistance in proportion to the pressure exerted on it. An unbalanced, pivoted proof mass is provided for exerting a pressure on the piezoresistive material when the device is accelerated, and a battery is connected in series with the piezoresistive material and a force coil which functions to restore the proof mass to its unaccelerated position. As the acceleration increases, the force on the piezoresistive material increases and its resistance drops. This increases the current in the force coil and the restoring force exerted on the proof mass so that the acceleration force is balanced out by the force produced by the force coil.

Accordingly, it is one object of the invention to provide a force balance accelerometer having a pickoff with sufficient output to drive directly the force applying means for returning the proof mass to the pickoff null position and thus eliminate the requirement for a control amplifier.

It is another object of the invention to provide a force balance accelerometer having a pickoff of piezoresistive material which changes its resistance in proportion to the pressure exerted thereon by a proof mass, the change in resistance being utilized to directly control a force coil for exerting a restoring force on the proof mass to return it to its null position.

It is a further object of the invention to provide a force balance accelerometer having a pickoff comprising a plurality of four piezoresistive elements arranged in a manner to sense acceleration along a sensitive axis in both positive and negative directions.

It is a still further object of the invention to provide a commercial polarized relay which can function as an accelerometer when suitable pickoffs of piezoresistive material are associated therewith.

It is a still further object of the invention to provide a force balance accelerometer which does not have any electronic parts.

It is a still further object of the invention to provide a force balance accelerometer which is simple and inexpensive, reliable and effective in operation, and rugged in construction.

Other objects and features of novelty of the present invention will be specifically pointed out or will otherwise become apparent when referring, for a better understanding of the invention, to the following description taken in conjunction with the accompanying drawings, wherein;

FIG. 1 is a sectional view of a force balance accelerometer embodying features of the present invention;

FIG. 2 is a schematic diagram of a control circuit for the accelerometer of FIG. 1; and FIG. 3 is a schematic diagram of a more simplified control circuit.

Referring to FIG. 1, a force balance accelerometer 10 is illustrated which embodies features of the invention. It comprises a coil 12 having a low reluctance housing 14 thereabout consisting of an upper portion 16 and lower portion 18 suitably secured together. An armature 20 having an unbalancing mass 22 extends through the coil and is pivotally mounted therein by a pin 24 extending perpendicularly through the axis of the coil. The portions 16 and 18 of the housing are provided with flanges 26 and 28, respectively, and elements 30–36 of a suitable piezoresistive material are fixed therebetween on opposite sides of the armature 20. Each of the elements 30–36 has plates 38 on the opposite faces thereof to facilitate electrical connection to the elements.

Referring to FIG. 2, the elements 30–36 may be connected in a bridge circuit 39 with the coil 12 connected between the juncture of the elements 30 and 32 and the juncture of the elements 34 and 36, and an external battery 40 connected between the juncture of the elements 32 and 36 and the juncture of the elements 30 and 34. A switch 41 may also be provided to open and close the circuit.

To complete the construction, a permanent magnet 42 may be positioned as illustrated in FIG. 1 with the north poles thereof engaging the upper and lower portions 16 and 18 of the housing to polarize the flanges 26 as north poles and the flanges 28 as south poles. Thus when the coil 12 is energized in a direction to polarize the left end of the armature as a north pole and the right end as a south pole, a counter-clockwise biasing force will be exerted on the armature.

When the accelerometer 10 is accelerated upwardly along its sensitive axis as illustrated by the arrow in FIG. 1, the unbalancing mass 22 exerts a clockwise torque on the armature 20 to exert pressure on the elements 30 and 36 to reduce their resistance. This unbalances the bridge and passes current through the coil 12 from right to left as viewed in FIG. 2 to exert a counter-clockwise restoring force on the armature 20 to return it to its null position. Conversely, when the accelerometer is accelerated downwardly along its sensitive axis, the pressure on the elements 32 and 34 is increased to reduce their resistance and unbalance the bridge in the opposite direction to pass current through the coil 12 from left to right to exert a clockwise restoring force on the armature 20.

By providing four elements 30–36 of piezoresistive material, the accelerometer 10 will sense both positive and negative acceleration along the sensitive axis. It is possible to simplify the circuitry with some loss in null stability and linearity. If only one piezoresistive element 36 is used as in FIG. 3, a current will flow at zero acceleration. This current will increase with positive (upward) acceleration, and decrease with negative acceleration. The device may be built with the gap which, in the illustrated embodiment, contains element 34 smaller than the gap containing element 36 (and/or the gap containing element 32 smaller than that occupied by element 30) to provide a magnetic bias equal and opposite to the bias caused by the current at zero acceleration. When this is done the device will sense both positive and negative accelerations as before, although the output current will have a constant bias.

While it will be apparent that the embodiments of the invention herein disclosed are well calculated to fulfill the objects of the invention, it will be appreciated that the invention is susceptible to modification, variation and change without departing from the proper scope or fair means of the subjoined claims.

What is claimed is:
1. A force balance accelerometer comprising a coil, an armature extending through said coil and pivotally supported at the center thereof for pivotal movement about an axis extending perpendicularly through the axis of said coil, first and second elements of piezoresistive material fixed with respect to said coil and positioned on opposite sides of one end of said armature, third and fourth elements of piezoresistive material fixed with respect to said coil and positioned on opposite sides of the other end of said armature, said first and third elements being positioned on the same side of said armature, an unbalancing mass on one of said arms of said armature, said elements being electrically connected in series with one another, said coil being electrically connected between the juncture of said first and second elements and the juncture of said third and fourth elements, and a source of D.C. power connected across the juncture of said second and fourth elements and the juncture of said first and third elements.

2. The invention as defined in claim 1 wherein said coil is surrounded by a two-piece housing of low reluctance material, and including magnetic means for magnetizing one of said housing portions as a north pole and the other of said housing portions as a south pole in a manner to exert a magnetic biasing force on said armature.

References Cited by the Examiner

UNITED STATES PATENTS

| | | | |
|---|---|---|---|
| 1,953,819 | 4/1934 | Payne | 73—398 |
| 2,193,910 | 3/1940 | Wilson | 73—505 |
| 2,338,732 | 1/1944 | Nosker | 73—517 |
| 2,618,776 | 11/1952 | Wiancko | 73—516 |
| 2,904,707 | 9/1959 | Drescher | 310—15 |
| 2,939,072 | 5/1960 | Bell | 73—517 |
| 2,946,226 | 7/1960 | Wendt | 73—517 |
| 3,015,959 | 1/1962 | Pratt | 73—517 |
| 3,052,127 | 9/1962 | Mott | 73—517 |

RICHARD C. QUEISSER, *Primary Examiner.*

JOSEPH P. STRIZAK, JAMES J. GILL, *Examiners.*